United States Patent [19]

McCrerie

[11] Patent Number: 5,588,633
[45] Date of Patent: Dec. 31, 1996

[54] MOUNTING BRACKET

[75] Inventor: Alan I. McCrerie, Preston, Great Britain

[73] Assignee: Winch & Engineering Limited, Lancashire, Great Britain

[21] Appl. No.: 256,546
[22] PCT Filed: Jan. 14, 1993
[86] PCT No.: PCT/GB93/00077
§ 371 Date: Sep. 7, 1994
§ 102(e) Date: Sep. 7, 1994
[87] PCT Pub. No.: WO93/14015
PCT Pub. Date: Jul. 22, 1993

[30] Foreign Application Priority Data

Oct. 20, 1992 [GB] United Kingdom ............ 9222015
Jan. 14, 1993 [GB] United Kingdom ............ 9201015

[51] Int. Cl.$^6$ ............... B66D 1/00; B60F 1/00
[52] U.S. Cl. ............... 248/647; 280/511
[58] Field of Search ............... 248/647, 669, 248/674, 681, 231.41, 316.4, 229.12, 224.7; 280/477, 511, 507

[56] References Cited

U.S. PATENT DOCUMENTS

| 3,159,368 | 12/1964 | Ahlbin et al. ............ 280/511 X |
| 3,718,317 | 2/1973 | Hilmer ............ 280/511 X |
| 3,831,982 | 8/1974 | Bernhardt et al. ............ 280/511 |
| 3,900,214 | 8/1975 | Brockelsby ............ 280/511 X |
| 4,106,754 | 8/1978 | Kucher . |
| 4,657,276 | 4/1987 | Hamerl ............ 280/477 X |
| 4,699,395 | 10/1987 | Hale ............ 280/511 |
| 5,002,259 | 3/1991 | Manning et al. . |
| 5,072,962 | 12/1991 | Webb . |
| 5,147,096 | 9/1992 | Rogers ............ 280/507 |
| 5,482,309 | 1/1996 | Hollis ............ 280/511 |

FOREIGN PATENT DOCUMENTS

| 0096953 | 12/1983 | European Pat. Off. . |
| 882874 | 11/1961 | United Kingdom . |
| 1024069 | 9/1964 | United Kingdom . |
| 2106469 | 4/1983 | United Kingdom . |
| 2161447 | 1/1986 | United Kingdom . |
| 2240314 | 7/1991 | United Kingdom . |
| 4029132 | 12/1994 | WIPO ............ 280/511 |

Primary Examiner—Karen J. Chotkowski
Attorney, Agent, or Firm—Oliff & Berridge

[57] ABSTRACT

A mounting bracket comprises a base and an attachment device for loosely attaching the bracket to a support wherein the bracket is allowed to move relative to the support.

8 Claims, 6 Drawing Sheets

MOUNTING BRACKET

This invention relates to a mounting bracket. In particular though not exclusively this invention relates to a mounting bracket for a winch. The winch can be a powered winch or can be a hand operated winch eg ratchet operated.

Winches which are driven by electric motors drawing power from a vehicle battery have to be secured to a vehicle in order for the winch to operate in an effective and convenient manner.

Winches used in this way can be operated to haul loads for example un-powered wheeled vehicles and logs. It is necessary that the line of draw of the winch can be varied without the need for continuous re-positioning of the vehicle on which the winch is mounted. It follows that the winch must be able to move relative to the vehicle depending on the relative positions of the vehicle and the load to be pulled by the winch.

The present invention seeks to provide a mounting bracket particularly for a winch which enables the winch to be easily secured on the vehicle and which allows the winch to swing relative to the vehicle.

The present invention further seeks to provide a mounting bracket particularly for a winch which can be conveniently attached to a vehicle by means of a ball hitch, a pin or a ball pin which are attached to the vehicle.

Accordingly the present invention provides a mounting bracket comprising a base, attachment means for loosely attaching the base to a support, and means allowing the base to move relative to the support.

The attachment means can comprise an opening in the base.

The support means can comprise a ball hitch, a pin hitch or a pin hitch terminating in a ball.

The means allowing the base to move relative to the support can comprise a tongue plate secured to the base engagable with the mouth of a guide plate secured to the ball hitch.

The mouth can include a recess in which one end of the guide plate is engagable.

The guide means can comprise a guide plate having a mouth engagable with a pin.

The base can conveniently include a carrying handle.

The attachment means can also comprise a first housing attached to the base and a second housing slidaly located within the first housing, the support being locatable within an opening in the second housing.

The first and second housings can include locating means to locate and guide the movement of the second housing with respect to the first housing.

The locating means can comprise at least one pin mounted on the second housing engagable in a slot formed in the first housing.

Alternatively the locating means can comprise a slot formed in the second housing engagable with the projection provided on the first housing.

In a further arrangement the attachment means can comprise a biased hinged latching mechanism.

The latching mechanism can comprise a spring loaded plated hinged to the base, the plate having an arcuate recess at its free end, the free end being locatable under a support whilst the support is positioned within a housing on the base.

The first housing can include a lip to assist in preventing the detachment of the bracket from the support.

The mounting bracket can be provided with a ball mounting.

The present invention further provides a winch secured to the bracket, the winch either comprising a power winch or a manually operated winch.

The present invention will now be more particularly described with reference to the accompanying drawings in which.

Figure 1:
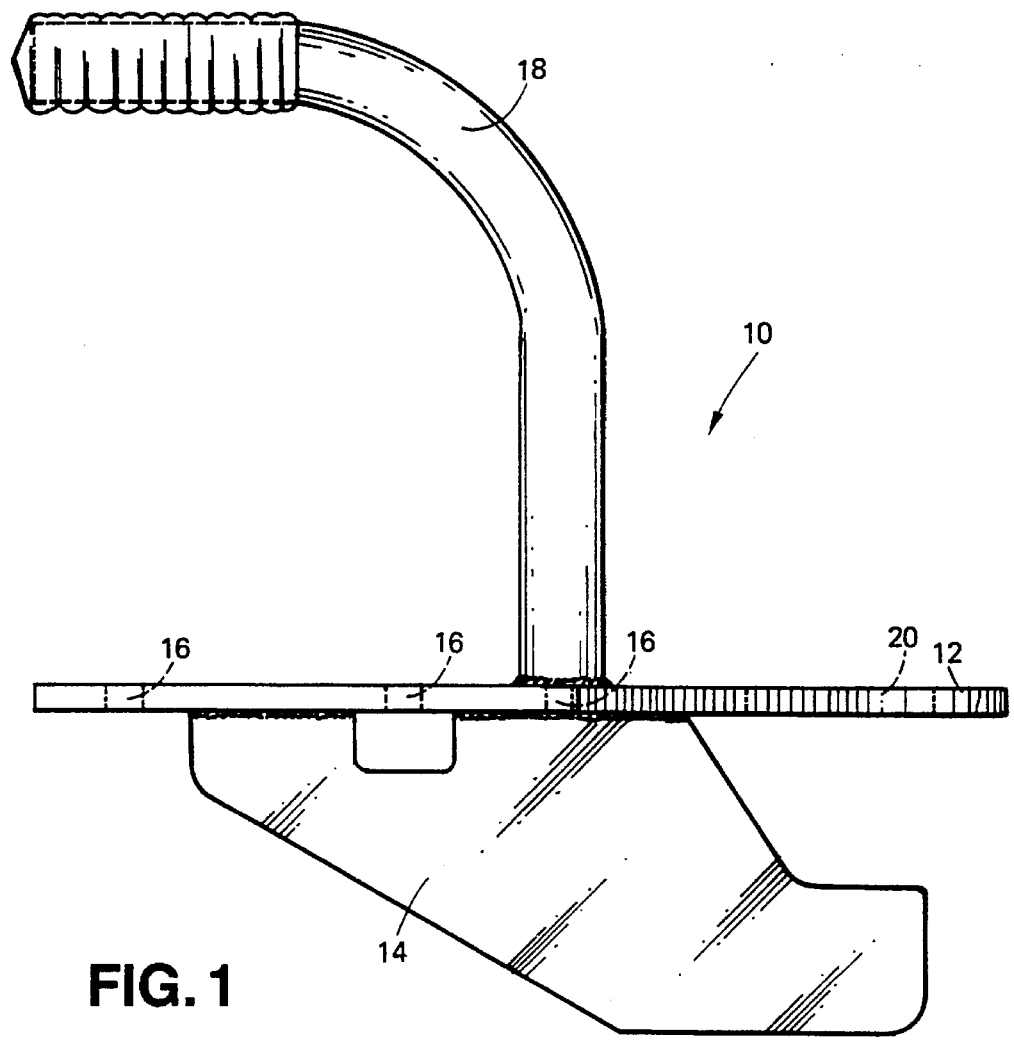
FIG. 1 shows a side elevation of one form of mounting bracket according to the present invention.
Figure 2:
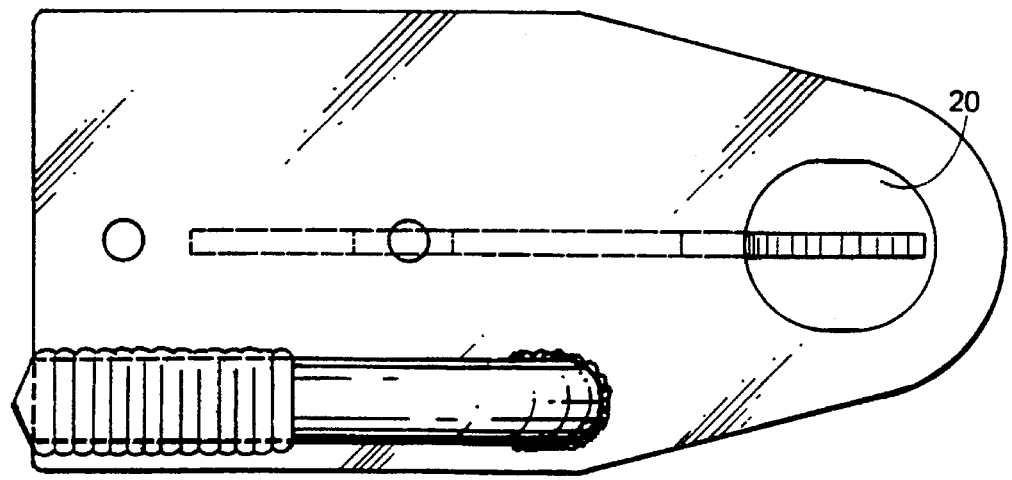
FIG. 2 shows a plan view of the mounting bracket shown in FIG. 1.
Figure 3:
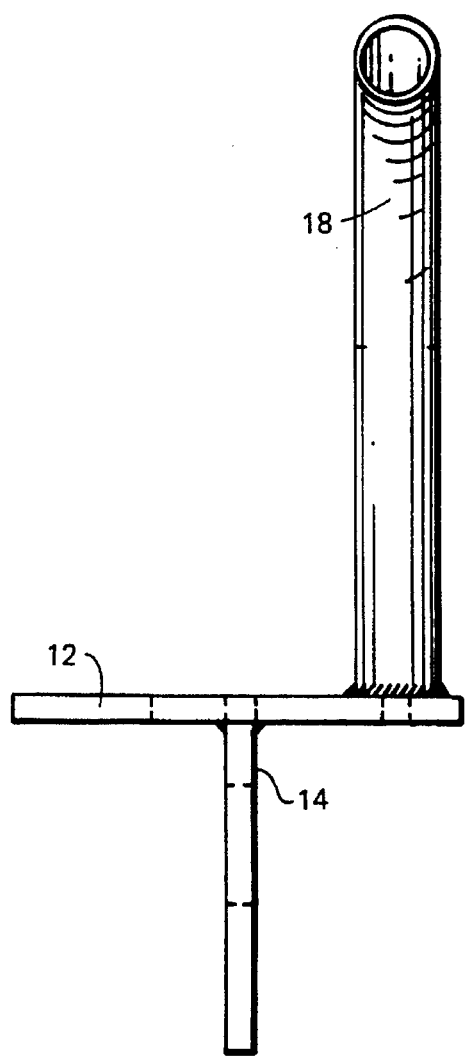
FIG. 3 shows an end elevation of the mounting bracket shown in FIGS. 1 and 2.

Referring to FIGS. 1 to 6 inclusive a mounting bracket (10) comprises a base (12) and a tongue plate (14) which is welded at right angles to the under surface of the base. The tongue plate can be formed integrally with the base, or can comprise part of the winch/hauling device.

The base plate (12) has a number of holes (16) enabling an item of equipment such as a power winch to be bolted to the base plate. The base plate also includes a carrying handle (18) and an elongate opening (20) the function of which is described below.

Figure 4:
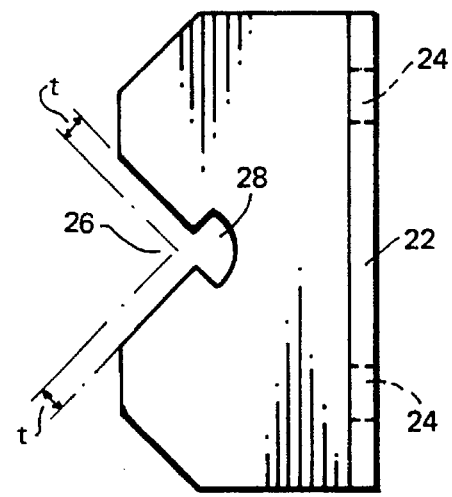
FIGS. 4, 5 and 6 show respectively plan views and end and front elevation views of a guide plate forming part of the mounting bracket shown in FIGS. 1 to 3 inclusive.
Figure 5:
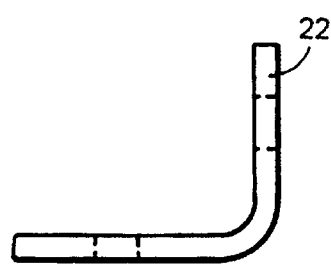
Figure 6:
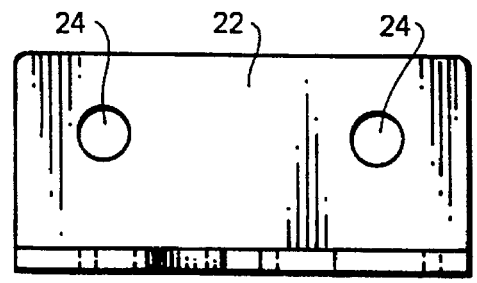

Referring particularly to FIGS. 4 to 6 inclusive the mounting bracket (10) includes a guide plate (22) is attached to a vehicle (not shown) by means of the bolts which secure a ball hitch (not shown) to the vehicle passing through holes (24). Alternatively the guide plate (22) can be incorporated into the ball hitch or vehicle tow bar.

The guide plate (22) includes a mouth (26) and a recess (28) and a tongue (14a) of the tongue plate is arranged to engage in the recess (28) and co-operate with the mouth (26) as will now be described.

The mounting bracket as described above can be incorporated into the construction of a winch or hauling device.

In use a power winch is bolted to the base (12) using the holes (16) or using integral similar features in the construction of the winch. The guide plate (22) is bolted to a vehicle by a vehicle ball hitch or using a combined ball hitch/tow bar guide plate. The power winch is loosely attached to the vehicle by passing the ball hitch through the opening (20) in the base plate (12) so that the forward edge of the opening (20) bears the against the shank of the ball hitch. The tongue (14a) of the plate (14) engages in the recess (28) of the guide plate (22). It will be appreciated that the weight of the winch is now supported by the reaction at the shank of the ball hitch and by the plate (22), and that the mounting bracket (10) can swing in the mouth (26) the limit of swing being determined by the arc of the mouth.

The dimension "t" is approximately equal to the thickness of the tongue (14a) so that the combination of the recess (28) and the mouth (26) positively limits the extent of swing of the mounting bracket on the shank of the ball hitch.

Therefore the winch can be used to haul loads over a wide range of relative positions between the vehicle to which the winch is attached and the load to be hauled.

The winch is usually powered by the vehicle battery and power can be taken from the battery to the electric motor of the winch by means of jump leads. Alternatively a standard form of socket can be made available adjacent the ball hitch, this socket being connected to the vehicle battery. The electric motor of the winch can have an appropriate socket connection and the two sockets connected together by a lead having appropriate plugs at each end.

Figure 7:
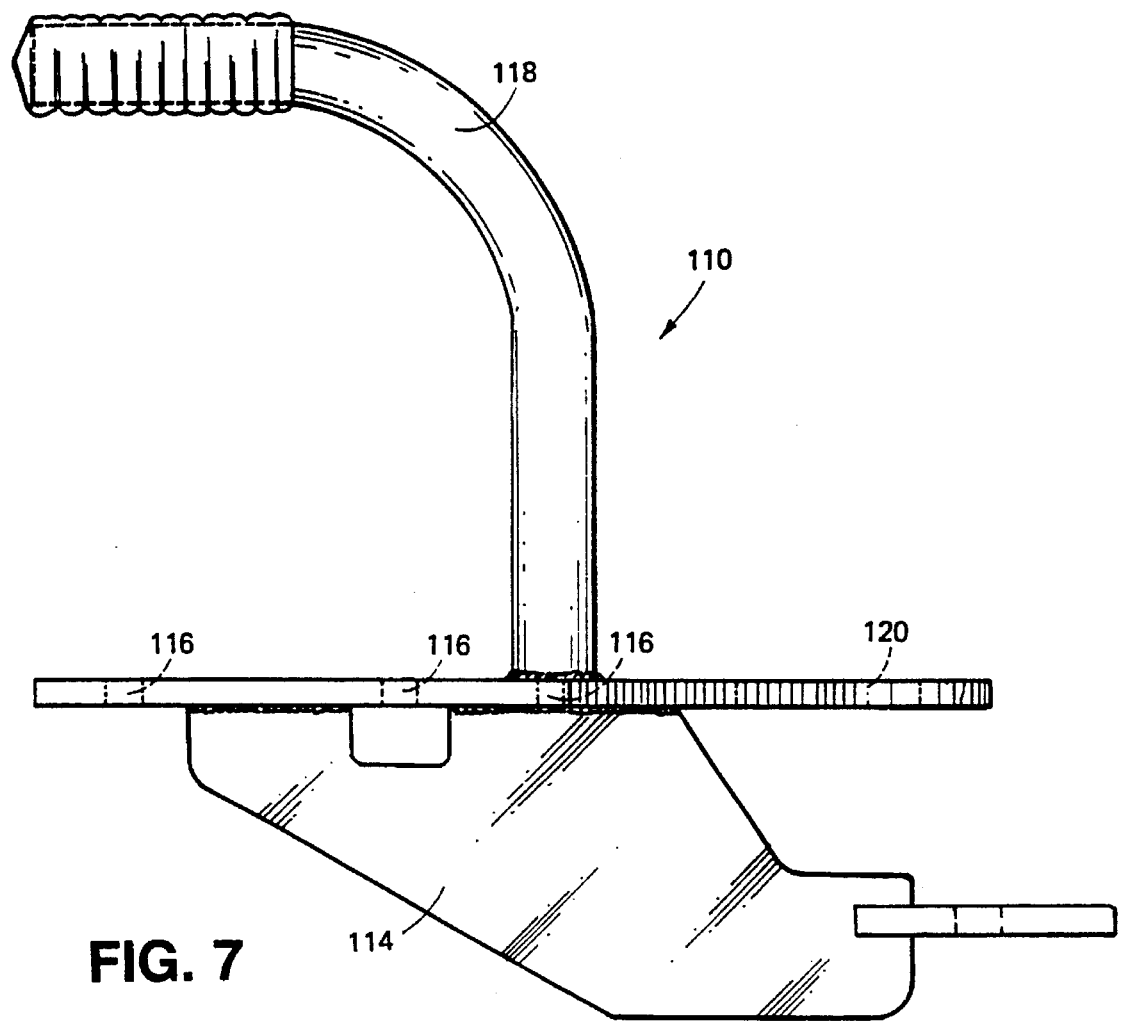
FIGS. 7 and 8 shows respectively the side elevation and plan view of another form of mounting bracket according to the present invention.
Figure 8:
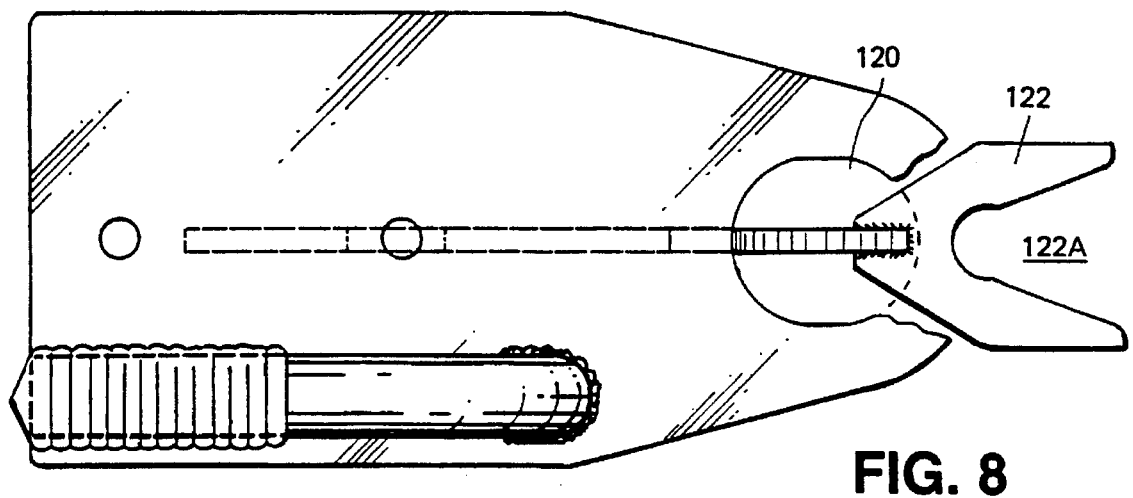

In an alternative arrangement shown in FIGS. 7 and 8 there is shown a mounting bracket (110) which is suitable for use in association with a vehicle having an offset pin hitch. The pin of this type of hitch does not have a ball but a ball is attached to the top jaw of the jaws through which the pin passes. The mounting bracket (110) has a base plate (112) a plate (114), the base plate (12) having holes (116) and a handle (118). The base plate (12) has a opening (120) and the plate (114) has a guide plate (122) formed with a mouth (122a).

In use the mounting bracket (110) is loosely secured to the ball hitch by passing the ball through the opening (120) and the pin of the hitch winch is positioned in the jaws engages the mouth (122a) of the plate (122). It will be appreciated that in this way the winch which is mounted on the mounting bracket (110) is supported on the pin hitch whilst allowing the bracket to swing in one plane relative to the pin hitch. In comparison with the mounting bracket shown in FIGS. 1 to 6 inclusive there is no positive restraint on the degree of swing provided by the mounting bracket. However in all other ways the mounting bracket (110) functions identically to the bracket (10).

Figure 9:
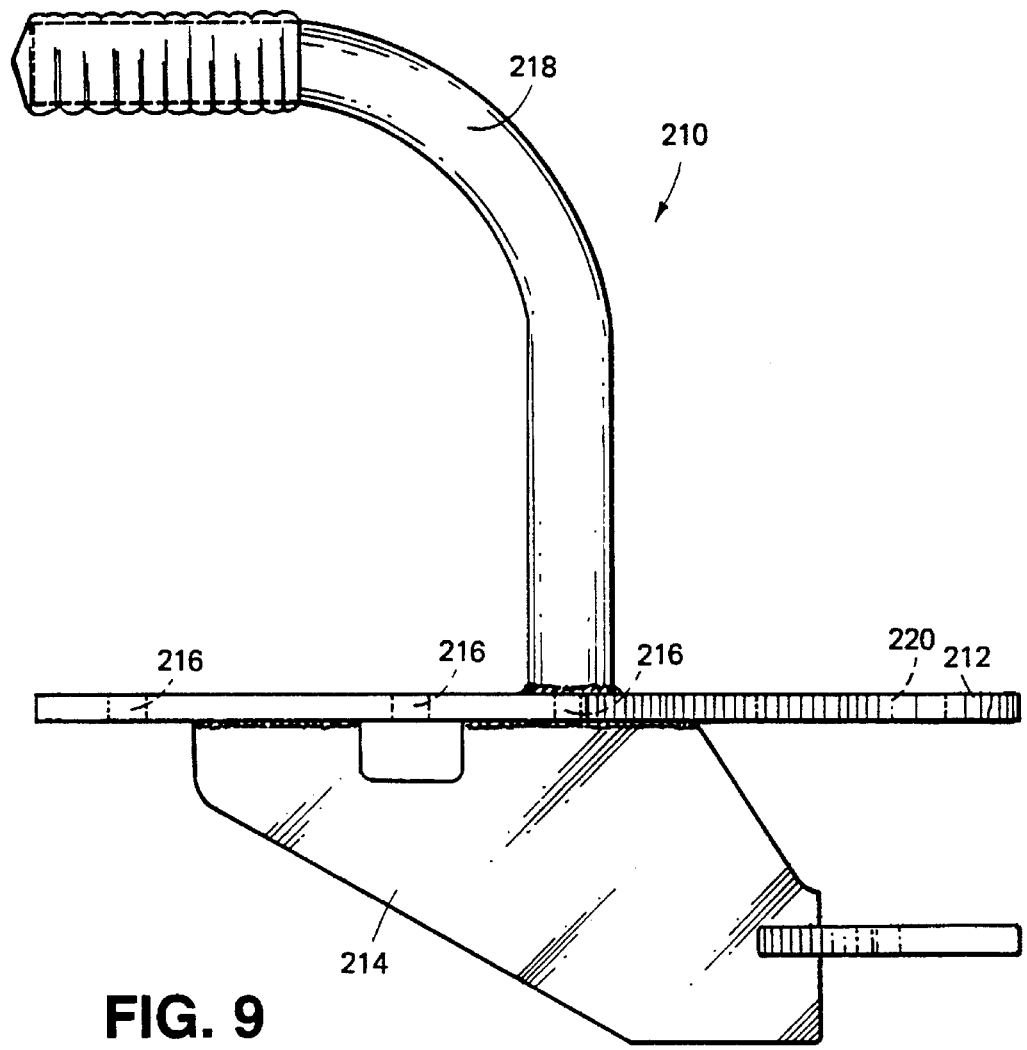
FIGS. 9 and 10 show respectively side elevation and plan view of a further form of mounting bracket according to the present invention.
Figure 10:
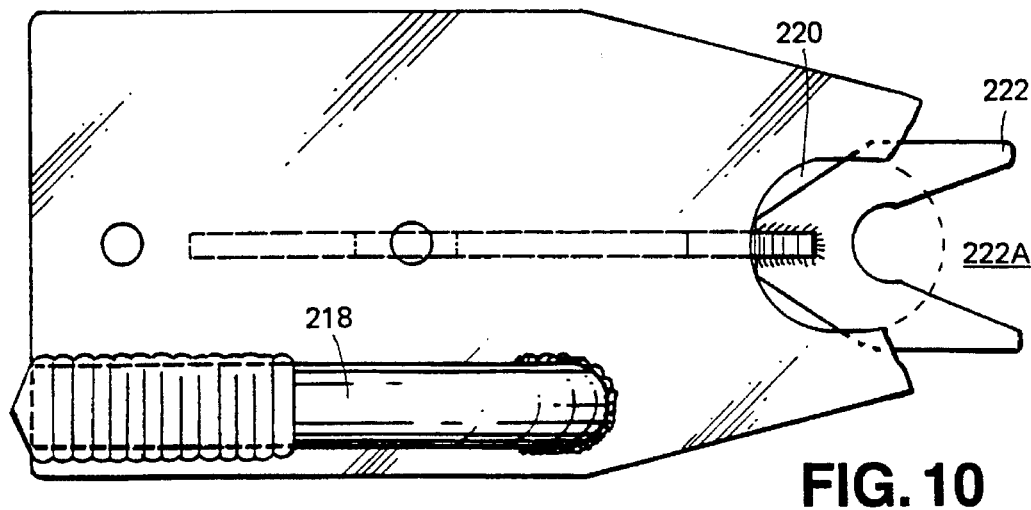

Referring to FIGS. 9 and 10 there is shown a mounting bracket (210) which is designed for use in association with a combined ball pin hitch.

The mounting bracket (210) comprises a base plate (212), a plate (214), the base plate having holes (216) and a carrying handle (218). The base plate (212) has an opening (220) and a guide plate (222) having a mouth (222a) is attached to the plate (214).

In use the mounting bracket (210) complete with a power winch is attached to the ball pin hitch by passing the ball of the hitch through the opening (220) and the mouth (222a) of the plate (222) engages the pin of the hitch. It will be appreciated that the mounting bracket (220) will then function in the same way as described with reference to FIGS. 7 and 8.

Figure 11:
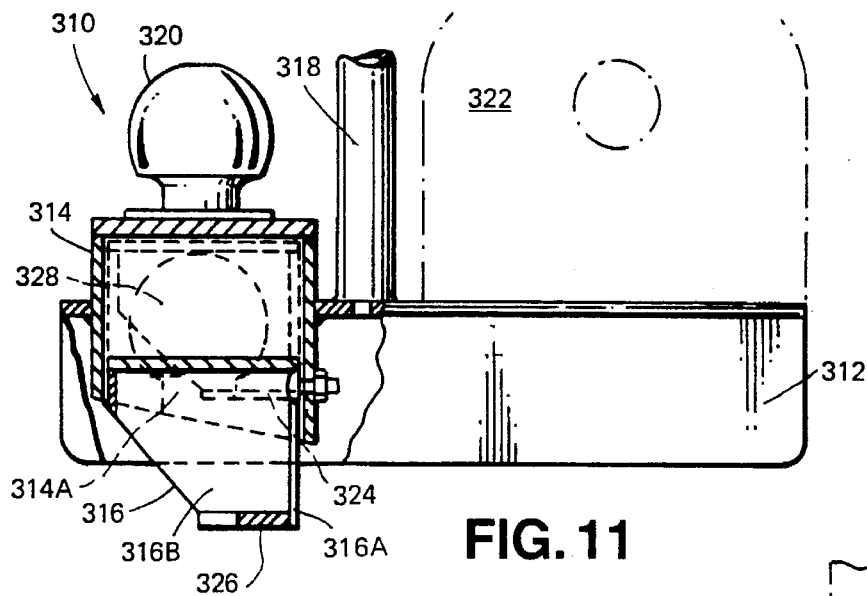
FIGS. 11, 12 and 13 show respectively front elevation, plan view and side elevation of a further form of mounting bracket according to the present invention.
Figure 12:
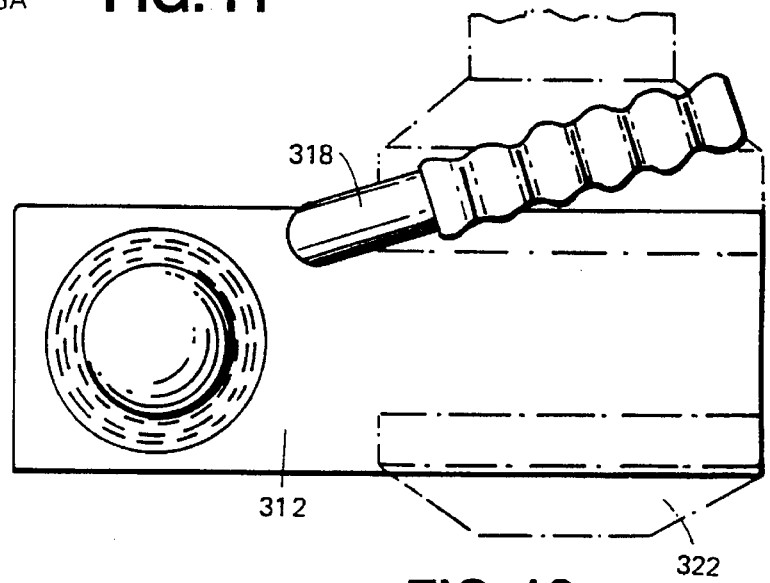
Figure 13:
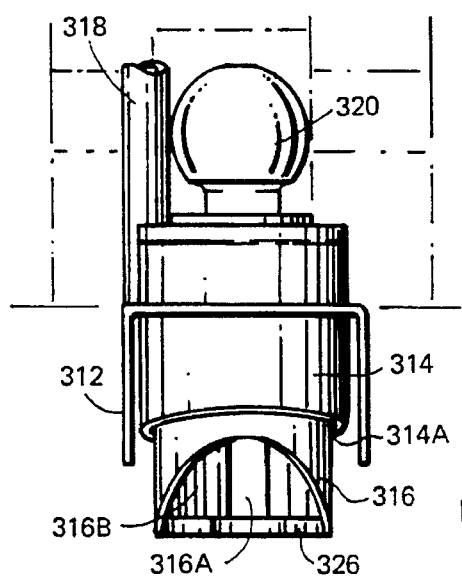

Referring to FIGS. 11, 12 and 13 inclusive, a mounting bracket (310) comprises a base plate (312) which is of a U-shaped channel section. A first housing (314) is fixed in a circular opening adjacent one end of the base plate (312) and a second housing (316) is slidably located within the first housing (314).

A carrying handle (318) is secured to the base plate (312) and a ball mounting (320) is mounted on the upper surface of the first housing (314).

A power winch (322) is shown in outline secured to the upper surface of the base plate (312).

The first housing (314) is provided with a nut and bolt assembly (324), the head of the bolt of the bolt assembly being located in a slot (316A) in the second housing (316). The nut and bolt assembly (324) retains the housing (316) within the housing (314) and guides the movement of the housing (316) with respect to the housing (314).

The housing (314) has a scarfed opening (314B) and the housing (316) also has a scarfed opening (316A). The lower end of the housing (316) is partially closed off by a semi-circular annular plate (326).

The mounting bracket (310) can be attached to a support such as a ball mounting (328) by inserting the ball mounting (328) into the opening (316B) of the second housing (316). The weight of the bracket (310) will then cause the housing (316) to move upwardly within the housing (314) to the position shown in outline in FIG. 11.

The shank of the ball mounting (328) will bear against the inner surface of the semi-circular annual ring (326) and the ball of the ball mounting will bear against the interior of the housing (314) when the weight of the mounting bracket is released and the bracket adopts a sloping position with respect to the support. It will be appreciated that in FIGS. 11, 12 and 13 the mounting bracket is shown in a horizontal position but it will normally be in an inclined position when the weight of the mounting bracket is taken fully by the support.

It will be appreciated that the mounting bracket can now swing horizontally and freely on the support, and can articulate in a vertical plane also with respect to the support.

Also the mounting bracket can be located on a standard or non-standard tow ball.

The mounting bracket can support a winch or any other form of equipment or apparatus.

The mounting bracket does not require any modification to the vehicle upon which the support is provided or anchor point or any fittings other than the standard or non-standard tow ball, and provides a strong platform for winching or other purposes.

Also the provision of the standard tow ball (320) provides the means also for attachment to a trailer or caravan tow bar socket thus providing a means of hauling a caravan or trailer by means of a winch attached to the mounting bracket.

Further the mounting bracket with an attached winch can be used independently of a caravan, trailer or other powered or non-powered vehicle.

Figure 14:
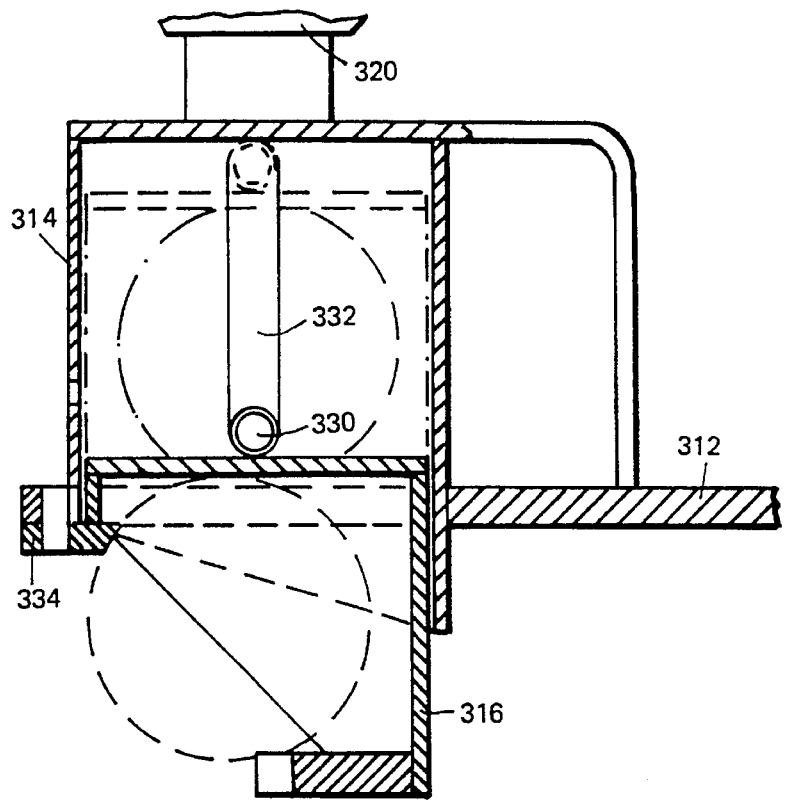
FIG. 14 shows a partial side elevation of a modified form of mounting bracket to that shown in FIG. 11.

Referring to FIG. 14 there is shown a modified form of guide and locating means other than the nut and bolt assembly (324) and the slot (316A).

In the arrangement in FIG. 14 the housing (316) is provided with two diametrically opposed pins (330) which are located in diametrically opposed vertical slots (332) provided in the housing (314).

The base plate (312) is also provided with an arcuate lip (334) which assists in preventing the mounting bracket from becoming detached from a tow ball particularly when the mounted bracket is articulated in a vertical plane.

Figure 15:
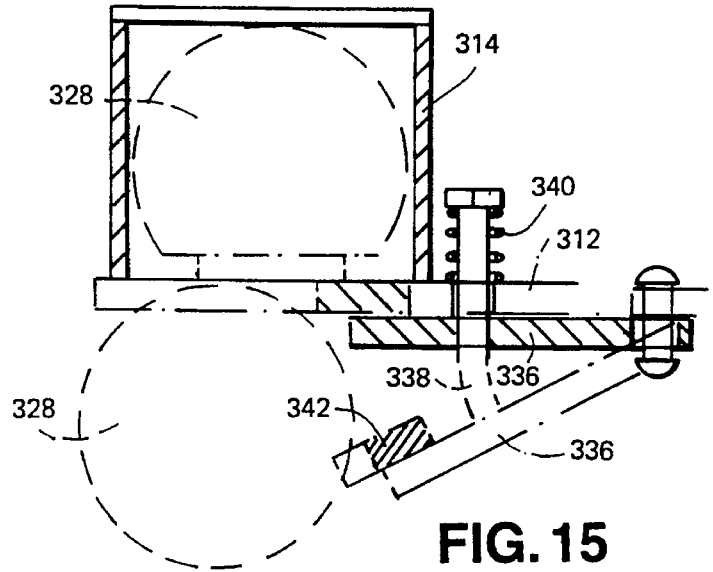
FIGS. 15 and 16 show respectively a partial side elevation and plan view of another form of mounting bracket according to the present invention.
Figure 16:
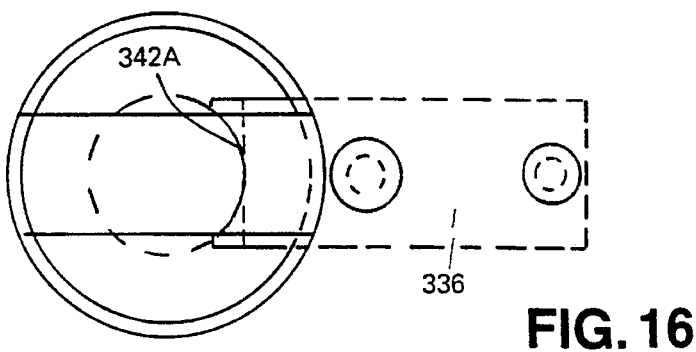

Referring now to FIGS. 15 and 16 there is shown an alternative form of attachment means enabling the mounting bracket to be secured to a tow ball.

The attachment means comprises a hinged latch (336) which can be pivoted relative to the base plate (312). A rod (338) is attached to the latch (336) and a spring (340) which bears at one end against the base plate (312) and at the other end against the end of the rod (338) biasses the latch to the closed position as shown in FIG. 15.

The free end of the latch (336) is provided with a plate (342) having an arcuate recess (342A).

In order to position the mounting bracket on a tow ball (328), the latch (336) is manually depressed against the load of the spring (340) to the position shown in outline of FIG. 15. The mounting bracket can then be placed in position on the tow ball (328) so that the tow ball is located within the housing (314). The latch (336) can then be released and the load in the spring (340) will close the latch so that the shank of the tow ball bears against the surface of the arcuate recess (342A). The mounting bracket will thus be secured to the tow ball (328)

The present invention enables an item of equipment such as a power winch to be securely attached to a vehicle whilst allowing the winch to swing relative to the vehicle allowing the line of pull to be such that the winch cable is not misaligned with the cable drum, thereby preventing binding of the cable.

Also one of the benefits of a mounting bracket according to the present invention is that the mounting bracket and therefore any piece of equipment mounted on it is constrained so that the bracket is only allowed to swing and is not allowed to twist or fall relative to for example a vehicle on which the bracket is mounted.

In an arrangement not illustrated the mounting bracket can be anchored for example to a tree or other appropriate support by means of webbing allowing a winch mounted on the bracket to be used in situations where it might not be possible to position a vehicle to provide the support. For example in hauling caravans up steep driveways.

I claim:

1. A mounting bracket, comprising:

a base plate; and attachment means for loosely attaching the mounting bracket to a vehicle's ball hitch so that the mounting bracket may move relative to the ball hitch, said attachment means being in a form of a first housing, which is secured to the base plate and has a lower end defining an opening, and a second housing which is located within the first housing and is capable of sliding upwardly and downwardly relative thereto, said second housing providing a socket for fitting over a ball member of the ball hitch, and the weight of the mounting bracket acting under gravity to slide said first housing downwards over said second housing to a position where said first housing serves to retain the ball member within said socket.

2. A mounting bracket as set forth in claim 1, wherein said first and second housings include locating means to locate and guide the sliding movement of the second housing with respect to the first housing.

3. A mounting bracket as set forth in claim 2, wherein said locating means comprises at least one pin mounted in said second housing and engageable in a slot formed in said first housing.

4. A mounting bracket set forth in claim 2, wherein said locating means comprises a slot formed in said second housing and engageable with a projection provided on said first housing.

5. A mounting bracket as set forth in claim 1, wherein said first housing includes a lip to assist in preventing the detachment of the mounting bracket from the ball member of the ball hitch.

6. A mounting bracket as set forth in claim 1, wherein said first housing includes a ball mounting.

7. A mounting bracket as set forth in claim 1, further comprising a carrying handle connected to the mounting bracket.

8. A mounting bracket, comprising:

a base, attachment means for loosely attaching the mounting bracket to a support comprising a first housing attached to the base and a second housing slidably located within the first housing, the support being locatable within an opening in the second housing, the first and second housings include locating means to locate and guide the movement of the second housing with respect to the first housing, the locating means comprises at least one pin mounted in the second housing and engageable in a slot formed in the first housing; and means allowing the mounting bracket to move relative to the support.

* * * * *